F. KAISER.
GRINDING MILL.
No. 82,532. Patented Sept. 29, 1868.
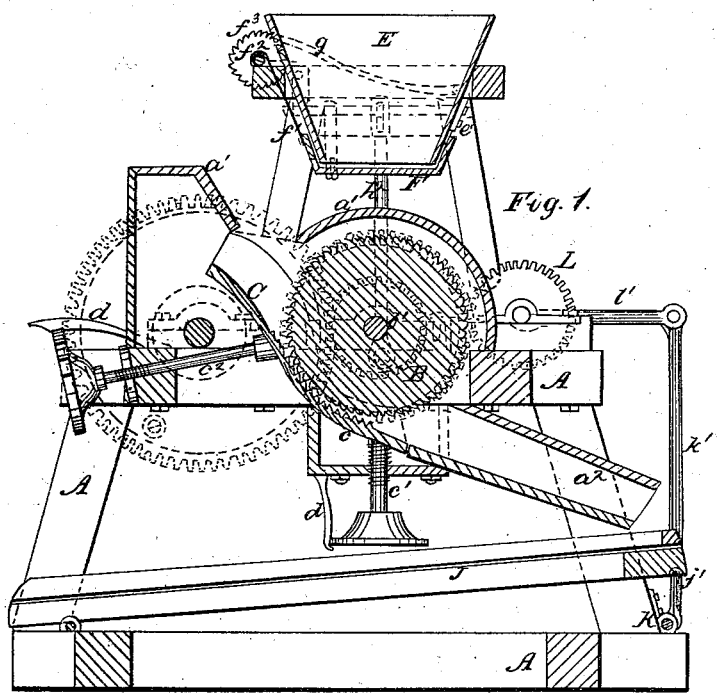
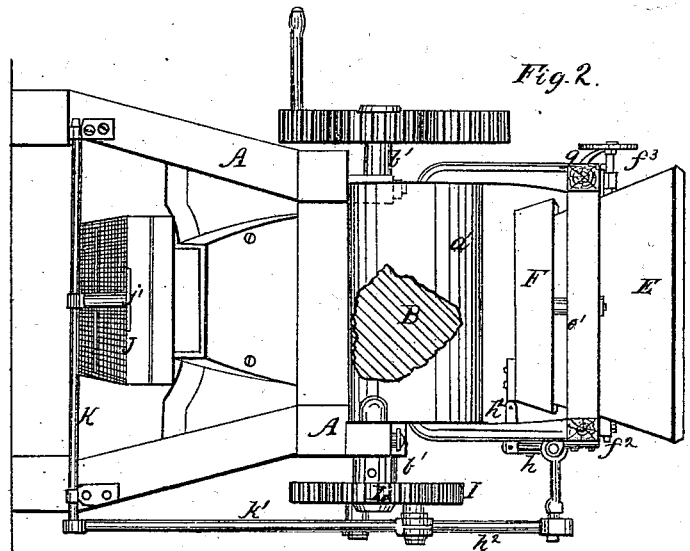
Witnesses.
Robert Buerger
B. H. Muehle
Inventor
Frank Kaiser

United States Patent Office.

FRANK KAISER, OF BUFFALO, NEW YORK.

Letters Patent No. 82,532, dated September 29, 1868.

---

IMPROVED GRINDING-MILL.

---

*The Schedule referred to in these Letters Patent and making part of the same.*

---

TO ALL WHOM IT MAY CONCERN:

Be it known that I, FRANK KAISER, of the city of Buffalo, in the county of Erie, and State of New York, have invented a certain new and improved Grinding-Mill; and I do hereby declare that the following is a full, clear, and exact description thereof, reference being had to the accompanying drawings, making a part of this specification, in which—

Figure I is a vertical section, and

Figure II an end elevation.

My invention consists in certain improvements in grinding-mills, as will be hereinafter more fully described.

Letters of like name and kind refer to like parts in each of the figures.

A represents the main frame of the machine, upon which all the operating parts are supported.

B represents a drum or cylinder, which has serrations formed upon the circular face, and is supported upon the main shaft $b'$. A covering or case is erected around this drum, as shown at $a^1$, which almost entirely surrounds it, leaving only a small space open upon one side for the introduction of the grain.

C represents an adjustable curved plate, having corrugations upon the inner face thereof, between which and those of the drum the grain is ground. This curved plate is supported upon and adjusted by two screw-bolts, $c^1$ and $c^2$, one of them, $c^1$, being placed vertically below the centre of the drum, and supporting the lower portion of the plate, and the other, $c^2$, at an angle of about forty-five degrees to the first, and supporting the upper portion of the plate. Each of these set-screws is provided with a notched hand-wheel, and with a spring-pawl, $d$, attached to the frame A, the pawls fitting into the notches, so that the screws may be firmly held in one particular position, until a change in that of the plate may render it necessary to turn the screws.

E represents a hopper, which is supported upon a portion of the frame A, directly over the drum B. It has an oscillating bottom, F, which is suspended upon the ends of rods, chains, or other connecting-devices, $e'$, and has a rim upon three sides thereof, leaving the fourth, which is directly above the hoppered opening in the case $a^1$, open for the egress of the grain from the hopper E. This open end of the hopper-bottom may be raised or lowered, in a manner to feed the grain faster or slower, by means of the bands or chains $f^1$ wound upon the shaft $f^2$, which carries the ratchet-wheel $f^3$.

A spring-bar or dog, $g$, the end of which rests between the teeth of the ratchet-wheel, is employed for holding the open end of the hopper-bottom at any elevation desired.

The oscillating motion of the hopper-bottom is produced by means of the bell-crank $h$, connecting-rod $h^1$, pitman $h^2$, and spur-wheel I upon the shaft $b'$.

The upper end of the pitman $h^2$ has a vertical slot, $s$, which not only gives an oscillating-motion to the bottom, F, of the hopper, but also a striking-motion both when the pitman is raised and lowered, whereby said bottom is forcibly shaken, so as to feed the grain freely to the grinding-drum.

J represents a sieve, located below the drum B, and supported upon a roller at one end, and a rocking-post, $j'$, at the other, in such manner that one end is at a greater elevation than the other, so that, when the sieve is shaken by the oscillation of the rocking-post, the flour falling through the spout $a^2$, upon the higher end of the sieve, will be screened or sifted, in its slow descent down the incline, through the meshes of the sieve, allowing the coarser flour and bran to pass off at the lower end of the sieve.

The rocking-post $j'$ is attached to a rock-shaft, K, which is set in motion by means of the upright connecting-rod $k'$, pitman $l'$, and the spur-wheel L, gearing with the wheel I upon the main shaft.

This machine may be operated by either hand, dog, or horse-power, and is, therefore, admirably adapted to the use of farmers who find it convenient or necessary to grind their own flour and feed.

I am aware that the various parts of my device are not new in themselves, and therefore do not claim them; but

What I claim as my invention, and desire to secure by Letters Patent, is—

The construction and arrangement of the serrated drum B, adjustable curved plate C, set-screws $c^1 c^1$, with notched heads and pawls, $d$, the hopper E, oscillating suspended bottom, F, slotted arm $h^2$, spout $a^2$, inclined sieve J, and rock-shaft K, substantially as described for the purpose specified.

FRANK KAISER.

Witnesses:
ROBERT BUERGER,
B. H. MUEHLE.